(12) United States Patent
Fricker

(10) Patent No.: US 9,424,229 B2
(45) Date of Patent: Aug. 23, 2016

(54) PARALLEL TORUS NETWORK INTERCONNECT

(71) Applicant: Advanced Micro Devices, Inc., Sunnyvale, CA (US)

(72) Inventor: Jean-Philippe Fricker, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 264 days.

(21) Appl. No.: 13/766,115

(22) Filed: Feb. 13, 2013

(65) Prior Publication Data

US 2014/0226479 A1 Aug. 14, 2014

(51) Int. Cl.
*G06F 15/173* (2006.01)
*H04L 12/851* (2013.01)
*H04L 12/54* (2013.01)

(52) U.S. Cl.
CPC .......... *G06F 15/17393* (2013.01); *H04L 47/24* (2013.01); *G06F 15/173* (2013.01); *H04L 12/5692* (2013.01)

(58) Field of Classification Search
USPC ........................................................ 370/235
See application file for complete search history.

(56) References Cited

U.S. PATENT DOCUMENTS

| | | | |
|---|---|---|---|
| 5,592,610 A | 1/1997 | Chittor | |
| 5,689,719 A | 11/1997 | Miura et al. | |
| 7,433,931 B2 * | 10/2008 | Richoux | 709/217 |
| 2006/0146825 A1 * | 7/2006 | Hofstaedter et al. | 370/392 |
| 2006/0173983 A1 * | 8/2006 | Naito et al. | 709/223 |
| 2007/0300201 A1 * | 12/2007 | Matsumoto et al. | 716/16 |
| 2008/0263386 A1 | 10/2008 | Darrington et al. | |
| 2011/0110225 A1 * | 5/2011 | Mihaly | H04L 12/5692 370/225 |
| 2012/0174175 A1 * | 7/2012 | Xu | H04N 5/782 725/110 |
| 2012/0209808 A1 * | 8/2012 | Tien | H04L 67/1095 707/622 |

OTHER PUBLICATIONS

International Search Report and Written Opinion of the International Searching Authority directed to related International Patent Application No. PCT/US2014/016045, mailed May 28, 2014; 9 pages.

* cited by examiner

*Primary Examiner* — Benjamin H Elliott, IV
*Assistant Examiner* — Yaotang Wang
(74) *Attorney, Agent, or Firm* — Volpe and Koenig, P.C.

(57) ABSTRACT

A system and method for optimizing a flow of data traffic are provided. A plurality of tori are connected in a parallel tori interconnect. Each torus includes a plurality of nodes. The nodes in the torus are interconnected using links. A host in the network is connected to a subset of nodes where nodes in the subset are associated with different tori. The host transmits the packets to the parallel tori interconnect by selecting a node the subset of nodes. The packets are transmitted using links between from the node to the plurality of nodes in the torus, but not between the plurality of tori.

20 Claims, 5 Drawing Sheets

PARALLEL TORUS NETWORK INTERCONNECT

BACKGROUND

1. Field

Embodiments are generally directed to optimizing network traffic, and more specifically to optimizing network traffic using a parallel tori interconnect.

2. Background Art

A torus is a network topology for connecting processing nodes in a parallel computer network. A torus may be arranged in a field array of N dimensions, where processing nodes (also referred to as nodes) are connected to the nearest neighbors using links.

In a conventional torus network topology, a torus interconnect has a limited bandwidth. The bandwidth is limited because each host that connects to a subset of nodes in the torus receives a fraction of the bandwidth. Thus, connecting hosts to the torus fabric through more nodes, steals the bandwidth from other nodes in the torus and other hosts connected to these nodes.

Links propagate data traffic between nodes in the torus interconnect. When a link in a torus interconnect congests or fails, the data traffic between the nodes that use the affected link is rerouted. The rerouting affects traffic latency in the torus network. For example, the rerouted traffic may take longer to arrive to its destination node using the rerouted path. In another example, the traffic that was originally scheduled to flow through the rerouted path is also affected due to increased congestion caused by the rerouted data traffic.

BRIEF SUMMARY OF EMBODIMENTS

A system and method for optimizing a flow of data traffic are provided. A plurality of tori are connected in a parallel tori interconnect. Each torus includes a plurality of nodes. The nodes in the torus are interconnected using links. A host in the network is connected to a subset of nodes where nodes in the subset are associated with different tori. The host transmits the packets to the parallel tori interconnect by selecting a node the subset of nodes. The packets are transmitted using links between from the node to the plurality of nodes in the torus, but not between the plurality of tori.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

Figure 1A:
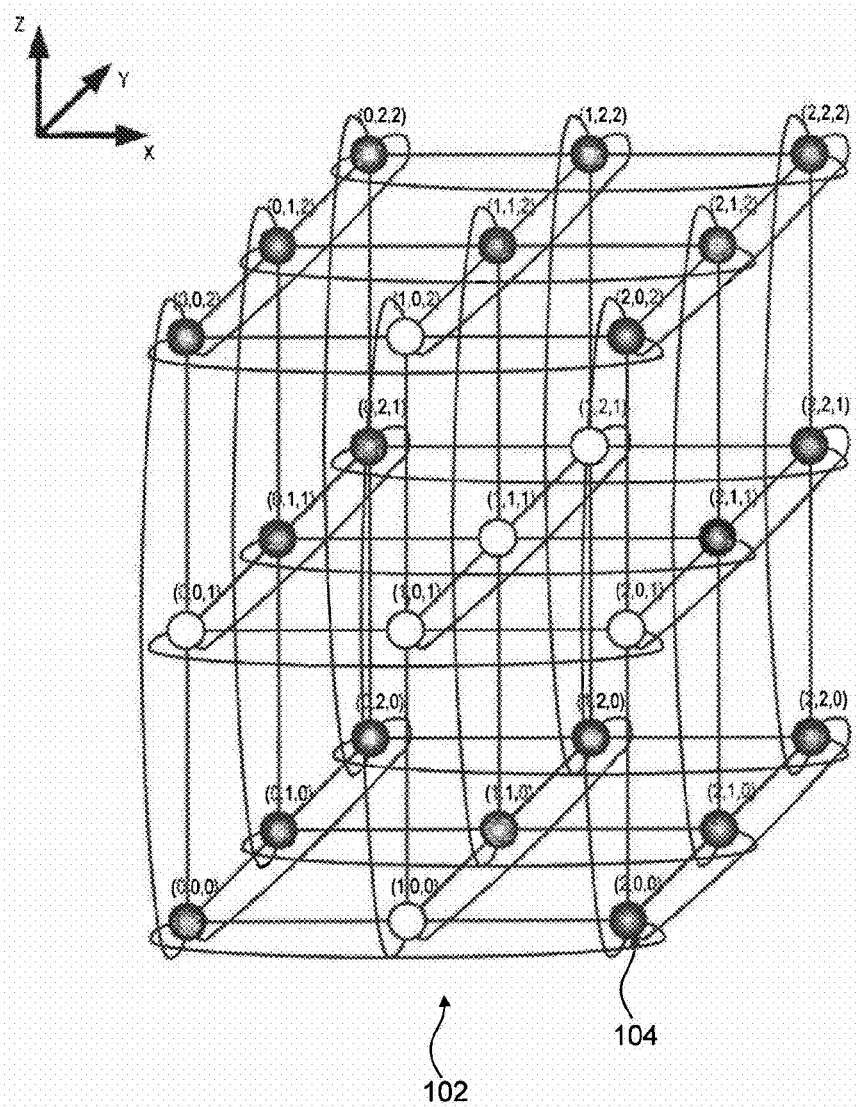
FIG. 1A is a block diagram of a three dimensional torus, according to an embodiment.

The embodiments will be described with reference to the accompanying drawings.

Generally, the drawing in which an element first appears is typically indicated by the leftmost digit(s) in the corresponding reference number.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure May not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise, It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components and/or groups thereof A conventional torus interconnect is implemented as a single torus network topology. A single torus network topology has several limitations. First, it has a limited bandwidth. For example, each host connects to a certain number of nodes in the torus. Because each torus has a finite total bandwidth, each connection receives a fraction of a total available bandwidth in the torus. When data traffic between the nodes requires more bandwidth than the bandwidth allocated to them in the torus, two nodes may be connected to each other using multiple links. This solution, however, reduces the bandwidth in the torus that is available to other nodes. Additionally, when a data traffic source is allocated extra links to connect to multiple nodes in the torus, the bandwidth that other hosts can use to connect to the torus is also reduced.

Second, failure or congestion of a link between the nodes in a conventional torus interconnect adversely affects the network. For example, various types of data traffic flows between the nodes of the conventional torus interconnect. When one of the links or nodes either fails or congests, the failure or congestion may affect all data traffic flowing through the link. To remedy the congestion or failure, the conventional torus interconnect may redirect the data traffic through other nodes. This may cause delays in the overall network. This issue is particularly noticeable when the data traffic is associated with a quality of service (QoS) or a class of service (CoS) that cannot be met due to a link or node failure or congestion.

Creating redundant links is rudimentary way to remedy a link failure or congestion in the conventional torus interconnect. Although redundant links may decrease probability of the reduced quality of service, class of service, or congestion, redundant links may also decrease bandwidth in the conventional torus interconnect, as discussed above.

A parallel tori interconnect discussed below is a solution to the limitations described above.

FIG. 1A is a block diagram 100A of a three dimensional (3D) torus, according to an embodiment. Block diagram 100 includes torus 102 that may be included in a parallel torus interconnect. Example torus 102 in block diagram 100 includes twenty-seven nodes 104 that are configured in rings of three nodes 104 each, although an implementation is not limited to this embodiment. The rings may be formed in three orthogonal dimensions (X, Y, Z). In an embodiment, each node 104 is a member of three different rings, one in each of the dimensions. The relative position of each node 104 is identified in FIG. 1 by the tuple (x, y, z), where x, y, and z represent a logical position of node 104 in X, Y, and Z coordinate axis. Additionally, each node 104 is connected to six neighboring nodes 104 via connections or links 106. In an embodiment, links 106 may be bidirectional connections.

In an embodiment, torus 102 represents a network. A network may be any network that carries data traffic and provides access to services and applications. A network may include, but is not limited to, a local area network (LAN), a metropolitan area network, and/or a wide area network (WAN), such as the Internet.

Nodes 104 are connectivity points in torus 102. In an embodiment, node 104 may be a computing device that is capable of sending, receiving, and forwarding data traffic over links 106. Example computing devices are described in detail in FIG. 4. Nodes 104 may be part of a network that includes clients, servers and peer nodes. In an embodiment, peer nodes may be client nodes or server nodes. In a non-limiting example, a client is a computing device described above, that requests data over a network, and processes and displays the received data. A server is an electronic device described above, that stores and distributes data to clients.

In an embodiment, torus 102 may be assembled as a mesh. In a mesh, nodes 104 capture and disseminate own data as well as relay data traffic from other nodes 104.

Although torus 102 depicted in FIG. 1A is a 3D array in the X, Y, and Z coordinate space, nodes 104 represent logical dimensions that describe the positions of each node 104 in a network with respect to other nodes 104, but do not necessarily represent physical dimensions that indicate the physical placement of each node 104. For example, the network topology for torus 102 that functions as a server can be implemented via the wiring of the fabric interconnect with nodes 104 in the network physically arranged in one or more rows on a backplane or in a rack. That is, the relative position of a given node 104 in torus 102 may be defined by nodes 104 to which it is connected, rather than the physical location of an electronic node that includes node 104. In some embodiments, torus 102 comprises a plurality of sockets wired together via the fabric interconnect so as to implement the torus network topology. Each of the nodes 104 comprises a field replaceable unit (FRU) (described below) configured to couple to the sockets used by the fabric interconnect, such that the position of node 104 in torus 102 is dictated by the socket into which the FRU is inserted.

In some embodiments, the links 106 between nodes 104 include one or more high-speed point-to-point serial communication links which utilize, for example, differential pair signaling between the connected processing nodes. For example, a bidirectional connection between nodes 104 can include one or more Peripheral Component Interconnect Express (PCIe) links or external PCIe links, such as a x1 PCIe link, a x4 PCIe link, a x8 PCIe link, or a x16 PCIe link, or a 10 Gigabit Ethernet (GbE) Attachment Unit Interface (XAUI) interface. In other embodiments, links 106 between nodes 104 may include Ethernet, Point-to-Point (PPP), High-Level Data Link Control (HDLC) protocol, and Advanced Data Communication Control Procedures (ADCCP) protocol interfaces, to name a few examples.

Figure 1B:
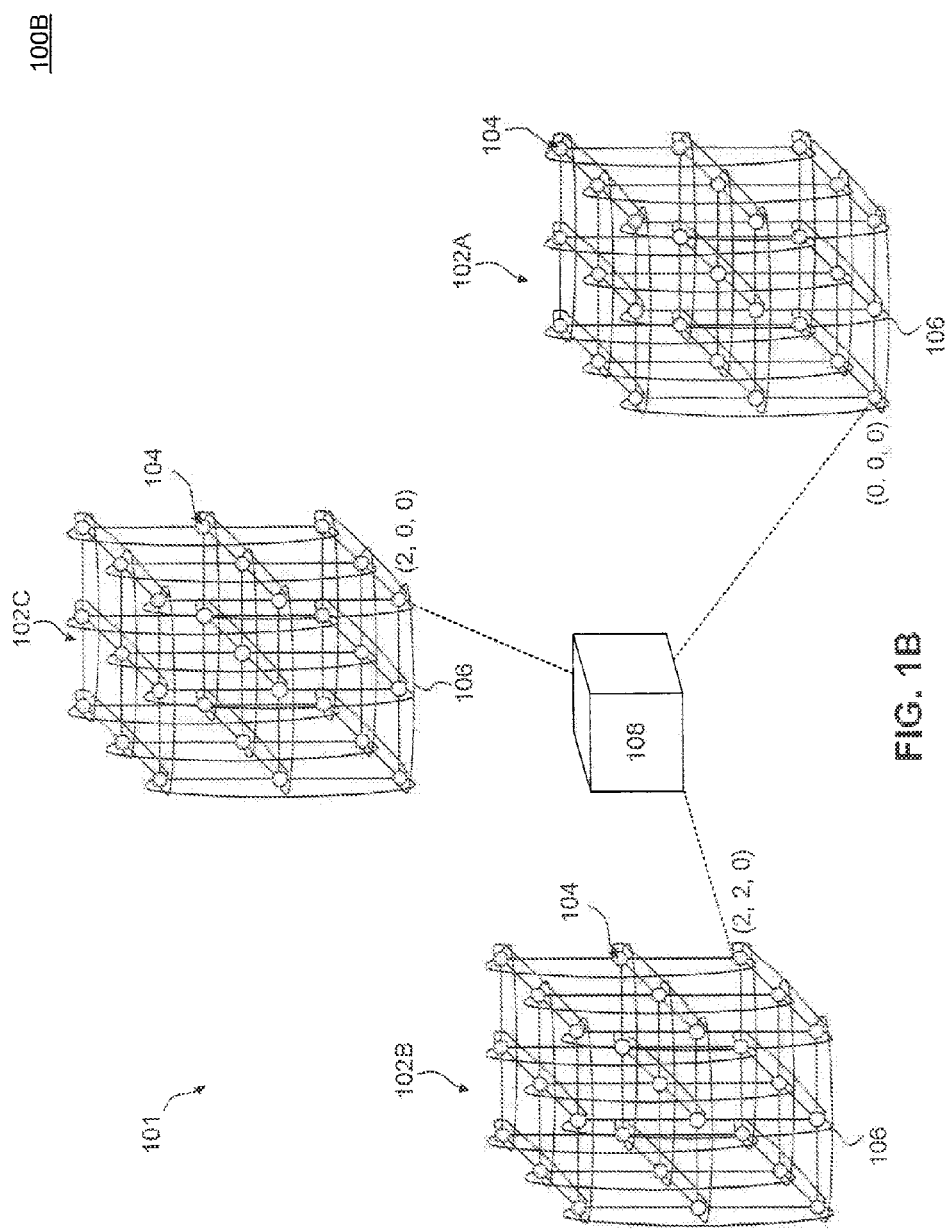
FIG. 1B is a block diagram of a parallel tori interconnect, according to an embodiment.

FIG. 1B is a block diagram 100B of a parallel tori interconnect 101, according to an embodiment. A parallel torus interconnect 101 includes multiple tori 102A-C that are described in FIG. 1A. In parallel tori interconnect 101, multiple nodes 104 from different tori 102 are connected to host 108. Host 108 is a computing device that distributes data traffic to tori 102, such as tori 102A-C in parallel tori interconnect 101. Unlike a conventional torus interconnect, where a host connects to nodes in a single torus, host 108 connects to nodes 104 in multiple tori 102. In the exemplary FIG. 1, host 108 connects to node (0,0,0) in torus 102A, node (2,2,0) in torus 102B and node (2,0,0) in torus 102C. The multiple connections to different tori 102 from host 108 form a parallel tori interconnect 101.

In an embodiment, host 108 uses sockets to connect to nodes 104 of different tori 102A-C. In an embodiment, a socket may include a socket address (such as an Internet Protocol or IP) address and a port number. In a parallel tori interconnect 101, nodes 104 from different tori 102 may connect to host 108 using the same socket address, but a different port number.

In an embodiment, each torus 102A, 102B and 102C is an independent, parallel, replica of others. When tori 102A-C in FIG. 1B are connected in parallel, each torus 102 represents a network that is its own ecosystem. That is, data traffic in one torus 102 does not mix with the data traffic in other tori 102 as it travels through nodes 104 in its respective torus 102. In an embodiment, data traffic may cross between tori 102A-C when it passes through host 108 and host 108 redistributes the data traffic to other tori.

In an embodiment, data traffic communicated between nodes 104 is segmented into packets. The packets are routed over a path between the source node and the destination node in one of tori 102 in parallel tori interconnect 101. In an embodiment, a source node is node 104 that connects to host 108 that transmits the packets into torus 102. In an embodiment, a destination node is node 104 that receives, stores and displays the data in the packet, but may not further propagate the packet. The path may include zero, one, or more than one intermediate nodes. In an embodiment, each node 104 includes an interface to the fabric interconnect that implements a link layer switch to route packets among the ports of the node connected to corresponding links of the fabric interconnect.

In an embodiment, host 108 connected to nodes 104 in different tori 102 selects a particular torus 102 to propagate data traffic. In one example, host 108 selects torus 102 based on a type of data traffic or preconfigured QoS requirements for different types of data. For instance, torus 102A may propagate data traffic having a "gold" QoS type, torus 102B may propagate data traffic having a "silver" QoS type, and torus 102C may propagate data traffic having a "bronze" QoS type, where the "gold", "silver", and "bronze" QoS types identify the upper bound of the guaranteed time that data traffic takes to arrive from a source node to a destination node. In another example, host 108 selects torus 102 based on congestion in torus 102. For example, if torus 102A experiences data traffic congestion, host 108 may transmit data traffic using torus 102B or 102C. Host 108 thus has control of distributing data traffic having a particular QoS across parallel tori interconnect 101, whereas nodes 104 within each torus 102 have control for propagating data traffic having a particular QoS within torus 102.

In another example, host 108 selects torus 102 based on a type of a CoS.

Example CoS may include a particular confidentiality group, a customer association, etc., that is represented in the data traffic. A type of CoS may be preconfigured within each CoS. In an embodiment, the type of CoS may be included in a data or voice protocols that is used to differentiate between different types of data traffic.

In another example, host 108 distributes data traffic across some or all parallel tori 102 according to a preconfigured algorithm in host 108. The algorithm may, for example, cause host 108 to monitor network congestion in each torus 102. In this embodiment, the effects of a node or link failure decrease because host 108 may re-route the data traffic to other parallel tori 102 based on traffic congestion or link failure in parallel tori interconnect 101.

When tori 102 are connected in parallel tori interconnect 101, the bandwidth of parallel tori interconnect 101 increases linearly with the number of tori 102. For example, the bandwidth of the network increases linearly by the bandwidth of each torus 102 added to parallel tori interconnect 101.

Scalability of software that manages parallel tori interconnect 101 is another advantage of parallel tori interconnect 101. For example, management software for parallel tori interconnect 101 may be scaled to manage each additional torus 102 added to parallel tori interconnect 101 and data traffic distribution to added torus 102. In an embodiment, when an additional torus 102 is added to parallel tori interconnect, the bandwidth between hosts 108 connected to nodes 104 in tori 102 prior to the addition, increases.

In an embodiment, the management software also manages QoS on each torus 102. In an embodiment, the management software executes on host 108 and distributes data traffic to parallel tori interconnect 101. In one example, the management software may distribute data traffic to each torus 102 according to QoS, as described above. In another example, the management software may distribute data traffic according to a security level. For example, data traffic associated with one security level may be distributed to one torus 102, and data traffic having another security level may be distributed to a different torus 102. This way, data traffic having different security levels is not transported over a single torus. Additionally, torus 102 that propagates data traffic having a particular security level can include additional security precautions. A person of ordinary skill in the art will appreciate that a security level may be set by an application or by a user using an application that sends or receives data.

In a further embodiment, hosts 108 may be restricted from sending data traffic to a particular torus 102 in parallel tori interconnect 101. For example, host 108 may be restricted to distributing data to a subset of tori 102 in parallel torus interconnect 101. One way to restrict the distribution of data is to connect host 108 to nodes 104 in the subset of tori (not shown). In another embodiment, host 108 may be physically connected to nodes 104 in parallel torus interconnect 101, but have the management software determine when to start and stop sending data to the connected nodes 104.

Figure 2:
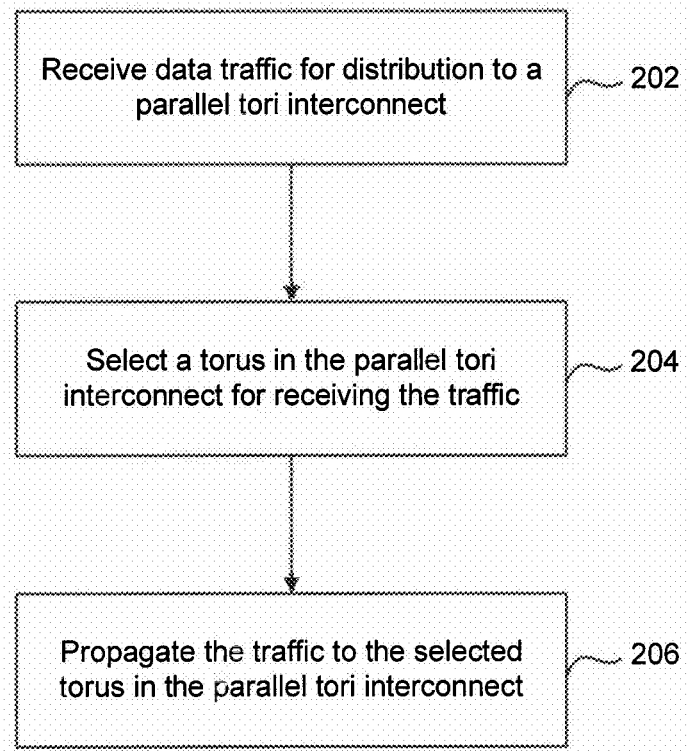
FIG. 2 is a flowchart of a method for propagating data traffic through a parallel tori interconnect, according to an embodiment.

FIG. 2 is a flowchart 200 of a method for propagating data traffic through a parallel tori interconnect, according to an embodiment.

At operation 202, a host receives data traffic. For example, host 108 receives data traffic for distribution through parallel tori interconnect 101.

At operation 204, the host selects a node that receives the data traffic. For example, host 108 is connected to a subset of nodes 104 in parallel tori interconnect 101, where nodes 104 in the subset of nodes are associated with different tori 102. For instance, host 108 may be connected to node (0,0,0) in torus 102A, node (2,2,0) in torus 102B and node (2,0,0) in torus 102C. When host 108 receives the data traffic, as, for example, packets, host 108 selects node 104 from the subset of nodes to receive the data traffic. As discussed above, the selection may be based on the congestion in tori 102 in parallel tori interconnect 101, a type of QoS specified in the data traffic, or security level associated with the data traffic, to name a few examples. For instance, based on the above, host 108 may select node (0,0,0) in torus 102A, node (2,2,0) in torus 102B or node (2,0,0) in torus 102C.

At operation 206, the data traffic is propagated to the selected node. For example, host 108 propagates the packets to node 104 selected in operation 204.

Figure 3:
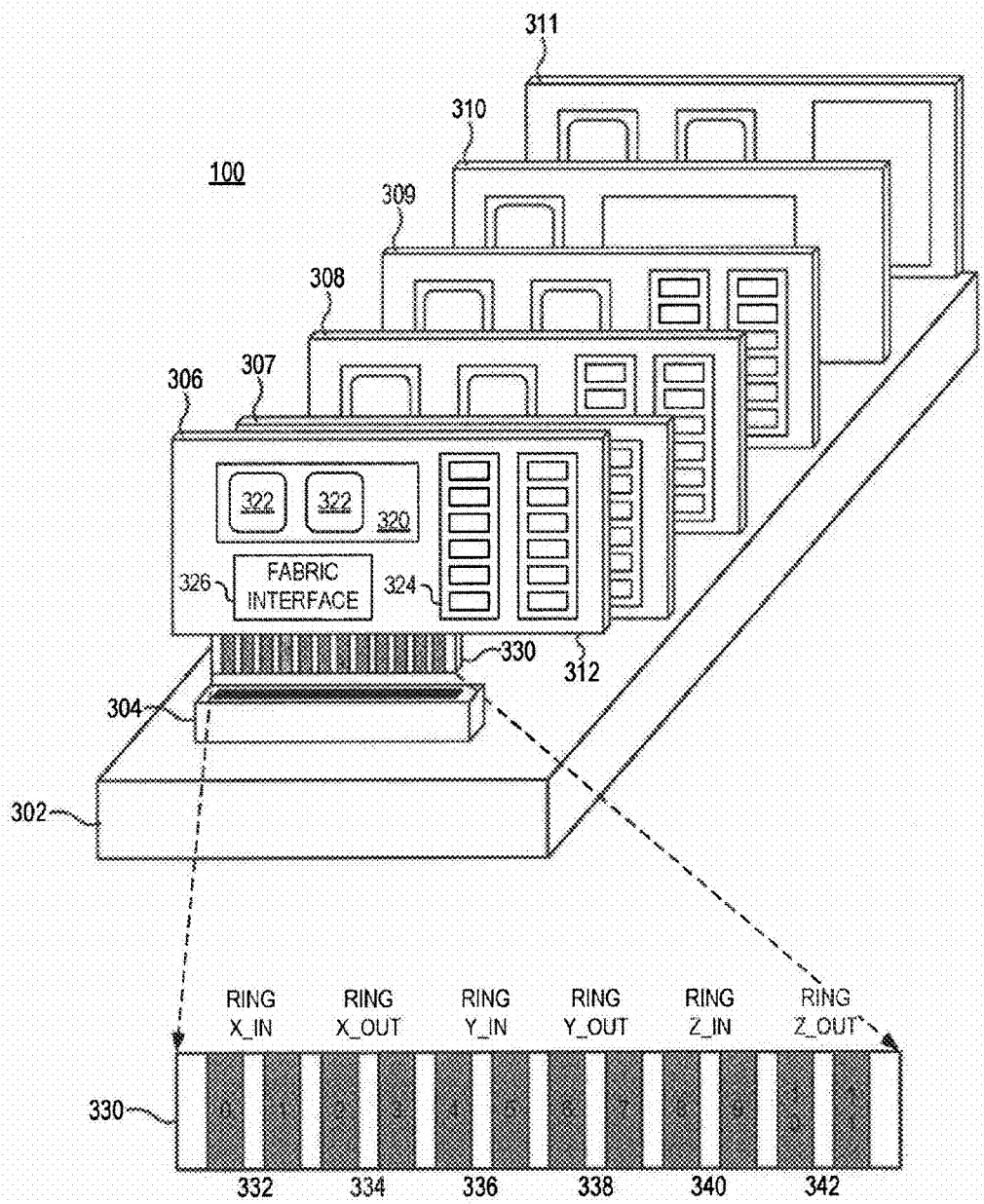
FIG. 3 illustrates an example physical arrangement of nodes in a parallel tori interconnect, according to an embodiment.

FIG. 3 is a block diagram 300 that illustrates an example physical arrangement of nodes in a parallel tori interconnect, according to an embodiment. In the illustrated example, the fabric interconnect includes one or more interconnects 302 having one or more rows or other aggregations of plug-in sockets 304. The interconnect 302 can include a fixed or flexible interconnect, such as a backplane, a printed wiring board, a motherboard, cabling or other flexible wiring, or a combination thereof. Moreover, the interconnect 302 can implement electrical signaling, photonic signaling, or a combination thereof. Each plug-in socket 304 comprises a card-edge socket that operates to connect one or more FRUs, such as FRUs 306-311, with the interconnect 302. Each FRU represents node 104 associated with a respective torus 102.

Each FRU includes components disposed on a PCB, whereby the components are interconnected via metal layers of the PCB and provide the functionality of the node represented by the FRU. For example, the FRU 306 includes a PCB 312 implementing a processor 320 comprising one or more processor cores 322, one or more memory modules 324, such as DRAM dual inline memory modules (DIMMs), and a fabric interface device 326. Each FRU further includes a socket interface 330 that operates to connect the FRU to the interconnect 302 via the plug-in socket 304.

The interconnect 302 provides data communication paths between the plug-in sockets 304, such that the interconnect 302 operates to connect FRUs into rings and to connect the rings into a 2D- or 3D-torus network topology, such as the torus network 100B of FIG. 1B. The FRUs take advantage of these data communication paths through their corresponding fabric interfaces, such as the fabric interface device 326 of the FRU 306. The socket interface 330 provides electrical contacts (e.g., card edge pins) that electrically connect to corresponding electrical contacts of plug-in socket 304 to act as port interfaces for an X-dimension ring (e.g., ring-X_IN port 332 for pins 0 and 1 and ring-X_OUT port 334 for pins 2 and 3), for a Y-dimension ring (e.g., ring-Y_IN port 336 for pins 4 and 5 and ring-Y_OUT port 338 for pins 6 and 7), and for an Z-dimension ring (e.g., ring-Z_IN port 340 for pins 8 and 9 and ring-Z_OUT port 342 for pins 10 and 11). In the illustrated example, each port is a differential transmitter comprising either an input port or an output port of, for example, a PCIE lane. A skilled artisan will understand that a port can include additional TX/RX signal pins to accommodate additional lanes or additional ports.

Figure 4:
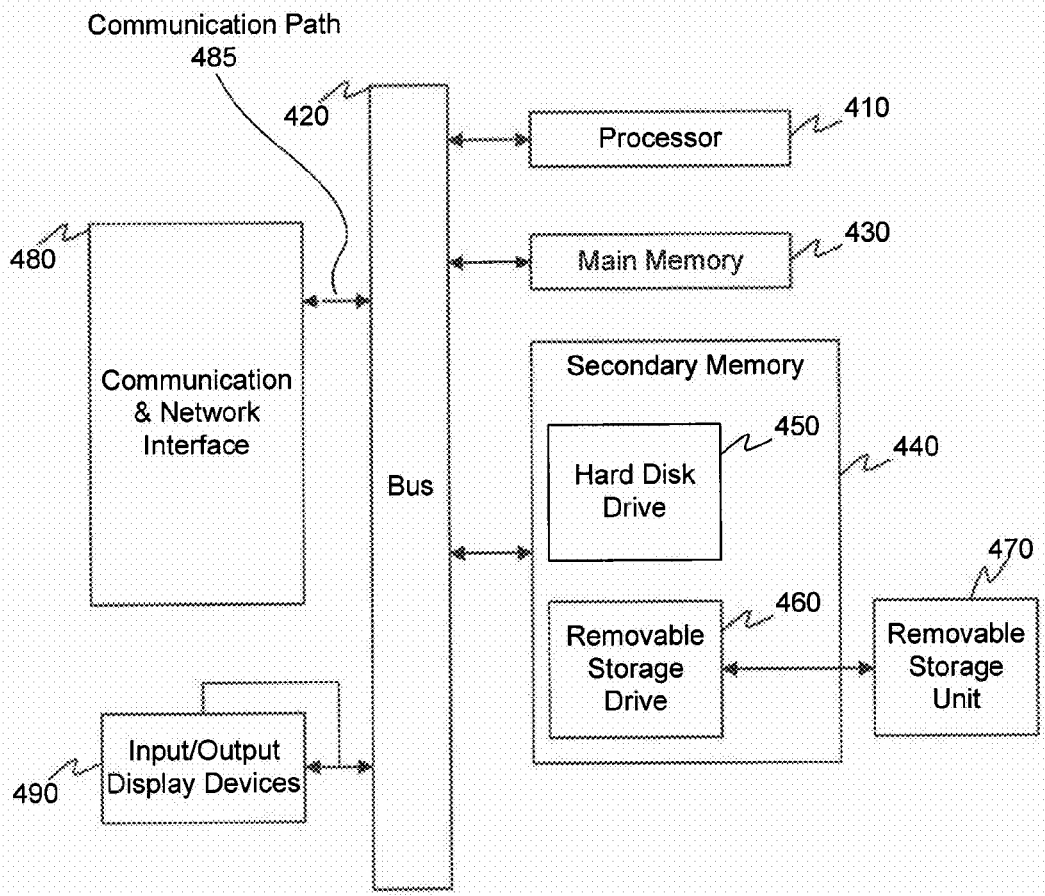
FIG. 4 is a block diagram of a computer system, where the embodiments may be implemented.

FIG. 4 is a block diagram 400 of a computer system, where the embodiments may be implemented.

Various embodiments may be implemented by software, firmware, hardware, or a combination thereof. FIG. 4 illustrates an example computer system 400 in which disclosed embodiments, or portions thereof, can be implemented as computer-readable code. For example, the methods illustrated by flowcharts described herein can be implemented in system 400. Various embodiments are described in terms of this example computer system 400. After reading this description, it will become apparent to a person skilled in the relevant art how to implement the embodiments using other computer systems and/or computer architectures.

Computer system 400 includes one or more processors, such as processor 410.

Processor 410 can be a special purpose or a general purpose processor. One example processor is a uses a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU"). A GPU, is another example processor that is a specialized electronic circuit designed to rapidly process mathematically intensive applications on electronic devices. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Processor 410 is connected to a communication infrastructure 420 (for example, a bus or network).

Computer system 400 also includes a main memory 430, preferably random access memory (RAM), and may also include a secondary memory 440. Secondary memory 440 may include, for example, a hard disk drive 450, a removable storage drive 460, and/or a memory stick. Removable storage drive 460 may comprise a floppy disk drive, a magnetic tape drive, an optical disk drive, a flash memory, or the like. The removable storage drive 460 reads from and/or writes to a removable storage unit 470 in a well-known manner. Removable storage unit 470 may comprise a floppy disk, magnetic tape, optical disk, etc. which is read by and written to by removable storage drive 460. As will be appreciated by persons skilled in the relevant art(s), removable storage unit 470 includes a computer usable storage medium having stored therein computer software and/or data.

In alternative implementations, secondary memory 440 may include other similar means for allowing computer programs or other instructions to be loaded into computer system 400. Such means may include, for example, a removable storage unit 470 and an interface (not shown). Examples of such means may include a program cartridge and cartridge interface (such as that found in video game devices), a removable memory chip (such as an EPROM, or PROM) and associated socket, and other removable storage units 470 and interfaces which allow software and data to be transferred from the removable storage unit 470 to computer system 400.

Computer system 400 may also include a communications and network interface 480. Communication and network interface 480 allows software and data to be transferred between computer system 400 and external devices. Communications and network interface 480 may include a modem, a communications port, a PCMCIA slot and card, or the like. Software and data transferred via communications and network interface 480 are in the form of signals which may be electronic, electromagnetic, optical, or other signals capable of being received by communication and network interface 480. These signals are provided to communication and network interface 480 via a communication path 485. Communication path 485 carries signals and may be implemented using wire or cable, fiber optics, a phone line, a cellular phone link, an RF link or other communications channels.

The communication and network interface 480 allows the computer system 400 to communicate over communication networks or mediums such as LANs, WANTs the Internet, etc. The communication and network interface 480 may interface with remote sites or networks via wired or wireless connections.

In this document, the terms "computer program medium" and "computer usable medium" and "computer readable medium" are used to generally refer to media such as removable storage unit 470, removable storage drive 460, and a hard disk installed in hard disk drive 450. Signals carried over communication path 485 can also embody the logic described herein. Computer program medium, computer usable medium, and computer readable medium can also refer to memories, such as main memory 430 and secondary memory 440, which can be memory semiconductors (e.g. DRAMs, etc.). These computer program products are means for providing software to computer system 400.

Computer programs (also called computer control logic) are stored in main memory 430 and/or secondary memory 440. Computer programs may also be received via communication and network interface 480. Such computer programs, when executed, enable computer system 400 to implement embodiments as discussed herein. In particular, the computer programs, when executed, enable processor 410 to implement the processes of the embodiments, such as the steps in the methods illustrated by flowcharts discussed above. Accordingly, such computer programs represent controllers of the computer system 400. Where the embodiment is implemented using software, the software may be stored in a computer program product and loaded into computer system 400 using removable storage drive 460, interfaces, disk drive 450 or communication and network interface 480, for example.

The computer system 400 may also include input/output/display devices 490, such as keyboards, monitors, pointing devices, etc.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication. networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

The embodiments are also directed to computer program products comprising software stored on any computer-usable medium. Such software, when executed in one or more data processing devices, causes a data processing device(s) to operate as described herein or, as noted above, allows for the synthesis and/or manufacture of electronic devices (e.g., ASICs, or processors) to perform embodiments described herein. Embodiments employ any computer-usable or -readable medium, and any computer-usable or —readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way, The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and. not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A parallel torus network interconnect system, comprising:
   a plurality of tori, each torus including a plurality of nodes, wherein:
      each node is a computing device configured to send and receive data traffic; and
      each node is connected to one or more other nodes in a same torus by a link; and
   a host connected to at least one node of each torus of the plurality of tori, the host configured to:
      select a first torus to propagate first data traffic having a first criteria and select a second torus to propagate second data traffic having a second criteria;
      distribute the first data traffic to a node in the selected first torus, wherein data traffic between nodes in one torus does not mix with data traffic in other tori; and
      redistribute data traffic received from a first node connecting the host to the first torus to a second node connecting the host to the second torus.

2. The system of claim 1, wherein each torus in the system is a three-dimensional torus.

3. The system of claim 1, wherein the host is configured to select the first and second torus based on a respective quality of service (QoS) of the first and second data traffic.

4. The system of claim 1, wherein the host is configured to select the first and second torus based on congestion in one of the tori.

5. The system of claim 1, wherein the host is configured to select the first and second torus based on a type of the first and second data traffic.

6. The system of claim 1, wherein the host is configured to select the first and second torus based on a class of service (CoS) associated with the first and second data traffic.

7. The system of claim 1, wherein the host is configured to select the first and second torus based on a respective security level of the first and second data traffic and the first and second torus.

8. A method for propagating data traffic in a parallel torus network interconnect system, the system including a plurality of tori, each torus including a plurality of nodes, the method comprising:
   receiving first data traffic having a first criteria and second data traffic having a second criteria at a host, the host connected to at least one node of each torus of the plurality of tori;
   selecting a node in a first torus by the host to receive the first data traffic and a node in a second torus by the host to receive the second data traffic;
   propagating the first data traffic by the host to the selected node in the first torus and propagating the second data traffic by the host to the selected node in the second torus, wherein data traffic between nodes in one torus does not mix with data traffic in other tori; and
   redistributing data traffic received from the node in the first torus connecting the host to the first torus to the node in the second torus connecting the host to the second torus.

9. The method of claim 8, wherein each torus in the system is a three-dimensional torus.

10. The method of claim 8, wherein the selecting includes selecting the first and second nodes based on a respective quality of service (QoS) of the first and second data traffic.

11. The method of claim 8, wherein the selecting includes selecting the first and second nodes based on a respective class of service (CoS) of the first and second data traffic.

12. The method of claim 8, wherein the selecting includes selecting the first and second node based on congestion in one of the tori.

13. The method of claim 8, wherein the selecting includes selecting the first and second nodes based on a security level of the first and second data traffic and the first and second tori.

14. A non-transitory computer-readable storage medium storing a set of instructions for execution by a general purpose computer to propagate data traffic in a parallel torus network interconnect system, the system including a plurality of tori, each torus including a plurality of nodes, the set of instructions comprising:
   a receiving code segment for receiving first data traffic having a first criteria and second data traffic having a second criteria at a host, the host connected to at least one node of each torus of the plurality of tori;

a selecting code segment for selecting a node in a first torus by the host to receive the first data traffic and a node in a second torus by the host to receive the second data traffic;

a propagating code segment for propagating the first data traffic by the host to the selected node in the first torus and propagating the second data traffic by the host to the selected node in the second torus, wherein data traffic between nodes in one torus does not mix with data traffic in other tori; and a redistributing code segment for redistributing data traffic received from the node in the first torus connecting the host to the first torus to the node in the second torus connecting the host to the second torus.

15. The non-transitory computer-readable storage medium of claim 14, wherein the selecting code segment includes selecting the nodes based on a respective quality of service of the first and second data traffic.

16. The non-transitory computer-readable storage medium of claim 14, wherein the selecting code segment includes selecting the nodes based on congestion in one of the tori.

17. The non-transitory computer-readable storage medium of claim 14, wherein the selecting code segment includes selecting the nodes based on a respective type of the first and second data traffic.

18. The non-transitory computer-readable storage medium of claim 14, wherein the selecting code segment includes selecting the nodes based on a respective class of service associated with the first and second data traffic.

19. The non-transitory computer-readable storage medium of claim 14, wherein the selecting code segment includes selecting the nodes based on a respective security level of the first and second data traffic and the first and second torus.

20. The non-transitory computer-readable storage medium of claim 14, wherein the instructions are hardware description language (HDL) instructions used for the manufacture of a device.

* * * * *